US006991383B2

(12) United States Patent
Huang

(10) Patent No.: US 6,991,383 B2
(45) Date of Patent: Jan. 31, 2006

(54) FUSION SPLICING OF HIGHLY RARE-EARTH-DOPED OPTICAL FIBERS

(75) Inventor: Wei-Ping Huang, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/920,794

(22) Filed: Aug. 18, 2004

(65) Prior Publication Data

US 2005/0063664 A1    Mar. 24, 2005

Related U.S. Application Data

(60) Provisional application No. 60/503,930, filed on Sep. 18, 2003.

(51) Int. Cl.
*G02B 6/255* (2006.01)
(52) U.S. Cl. ............................ 385/97; 385/96
(58) Field of Classification Search ............... None
See application file for complete search history.

(56) References Cited

U.S. PATENT DOCUMENTS

| 6,062,743 | A  * | 5/2000 | Zheng et al. ................. 385/95 |
| 6,294,760 | B1 * | 9/2001 | Inoue et al. .................. 385/97 |
| 6,921,216 | B1 * | 7/2005 | Li et al. ....................... 385/96 |
| 2002/0157424 | A1 | 10/2002 | Kasuu et al. |
| 2002/0159724 | A1 * | 10/2002 | Oki et al. .................... 385/97 |
| 2002/0176673 | A1 | 11/2002 | Kasuu et al. |
| 2002/0197027 | A1 | 12/2002 | Saito et al. |
| 2003/0002827 | A1 | 1/2003 | Ozawa et al. |
| 2003/0108307 | A1 * | 6/2003 | Eskildsen et al. ............ 385/96 |
| 2005/0117856 | A1 * | 6/2005 | Huang et al. ................ 385/96 |

FOREIGN PATENT DOCUMENTS

WO     WO 01/86331     11/2001

OTHER PUBLICATIONS

K. Shiraishi, et al.; "Beam Expanding Fiber Using Thermal Diffusion of the Dopant", Journal of Lightwave Technology, vol., 8, No. 8, Aug. 1990.
K. Shiraishi, et al.; "Light-Propagation Characteristics in Thermally Diffused Expanded Core"; Journal of Lightwave Technology, vol. 11, No. 10, Oct. 1993.
K. Shigiharai, et al.; "Modal field transforming fiber between dissimilar waveguides", J. Appl. Phys., vol. 50, p. 4293, Dec. 15, 1986.

* cited by examiner

*Primary Examiner*—Frank G. Font
*Assistant Examiner*—James P. Hughes

(57) ABSTRACT

A method and arrangement for achieving low splice-losses when connecting Highly Rare-Earth-Doped (HRED) optical fibers and dissimilar optical fibers having a large Mode Field Diameter (MFD) mismatch. Warm images are taken during a pre-fusion process to capture thermal light emissions and determine an arc-center position. The end-surfaces of the fibers are abutted and longitudinally offset from the arc-center, based on the light propagation direction and the MFD-mismatch. The fibers are then asymmetrically heated with different fusion temperatures during the main fusion processes. An MFD-match is achieved with well-defined fusion currents and fusion time. To maintain the same offset distance in a sequence of splices, the main-fusion arc-center position is determined by a process of direct arc-recentering. Variations of fusion temperature caused by changes of electrode conditions and the operating environment are monitored in real-time, and an arc-check process is invoked to compensate for the large variations of fusion temperature.

27 Claims, 6 Drawing Sheets

FUSION SPLICING OF HIGHLY RARE-EARTH-DOPED OPTICAL FIBERS

BACKGROUND

The present invention relates to communication systems. More particularly, and not by way of limitation, the present invention is directed to a method and arrangement for splicing Highly Rare-Earth-Doped (HRED) optical fibers and dissimilar optical fibers having a large Mode Field Diameter (MFD) mismatch.

In recent years, greater numbers of HRED fibers have been developed for special applications in optical communication systems. Examples include Erbium-Doped Fiber Amplifiers (EDFA), Amplified Spontaneous Emission (ASE) light sources, fiber lasers, and the like. HRED fibers are very attractive due mainly to the excellent performance achieved by a very short length of fiber. For example, by using highly Erbium-Doped Fibers (EDFs) characterized by the peak absorption of 40 dB/m at operating wavelengths, it is possible to reduce the required length of fiber by a factor of 5–10 to get the same performance achieved by traditional optical fibers. EDFs have high power density output, broad and flat gain profile, and low nonlinear effects. Thus, HRED fibers enable the development of more compact and cost-effective communication systems.

The major deterrent to the use of HRED fibers is high splice loss when spliced with dissimilar fibers. A primary reason causing high splice losses for HRED fibers is the initial MFD-mismatch. Because of general demands in the design of systems, HRED fibers are often fusion spliced to dissimilar fibers that have significant difference in MFD, but do not have the rare-earth dopants. A typical example of such a fiber is the Corning SMF28™, and its MFD is approximately twice that of HRED fibers.

In the past, a number of methods have been proposed and developed to reduce the MFD-mismatch during fusion processes. These methods involve mainly an additional thermal treatment applied on the butted portion of fiber having relative smaller MFD (for example, EDFS). The original concept of thermal treatment, developed for the fabrication of optical fiber components, is known as "Thermally-diffused Expanded Core (TEC) fibers" (cf. K. Shigihara, et al; J. Appl. Phys., vol.60, p4293, 1986; and K. Shiraishi, et al; *J. Lightwave Technol.*, vol.8, p1151, 1990).

A TEC method of splicing dissimilar types of fibers is disclosed in U.S. patent Publication No. US 2002/0197027. After fusion splicing of two fibers, the splice point is immediately repositioned so that the additional electric discharge can be applied to the abutted portion of fiber having the relative small MFD. Similar methods using TEC techniques are also disclosed in U.S. patent Publication No. US 2002/0157424 and US 2002/0176673. The methods utilize processes in which the end-faces of two optical fibers are spliced, instead of moving spliced fibers; the additional heating treatment is performed by moving the heating unit (i.e., the electrodes) onto the butted portion of spliced fiber or by heating the splice point asymmetrically with assistance of a heat-board mounted at the vicinity of butted portion of fibers.

The Applicant's studies have found that the previous methods using TEC techniques may work effectively for fibers without rare-earth dopants and/or with low concentration of dopants, but they are not effective for HRED fibers. It was discovered that, for the HRED fibers, besides the problem of initial MFD-mismatch, the major cause of high splice losses can be attributed to fast diffusion of core dopants occurring in the fusion processes. If the initial MFD-mismatch of two fibers is relatively small, the MFD-match of the two fibers may be reached at the very beginning of the main fusion process that is used to make the ordinary splice. Thus, instead of achieving the MFD-match, the additional heat treatment used in the previous methods may lead to an inverted MFD-mismatch (i.e., the HRED fiber that ordinarily has a smaller MFD gets an effective MFD that is much larger than that of the connected fiber). Thus, in the case of light injection from the HRED fiber, the cladding modes are easily excited, and splice losses as high as 0.2–0.5 dB often occur.

Another problem observed in the TEC processes is inconsistent results of splice losses occurring in a sequence of splices. This problem is mainly caused by a phenomenon known as "arc-walk". Arc-walk refers to the variation of arc-center position from one arc-discharge to the next, due mainly to dynamic changes of deposited particles/layers on the electrodes. The "arc-walk" significantly changes the relative position of heat-distribution at the butted portions of fibers, which in turn varies splice losses.

The problem of arc-walk may be overcome by the method of "arc-recentering" disclosed in International Patent Application No. WO 01/86331. With this method, warm images are taken during fusion processes. The thermal radiation emitted from the heated portion of fiber as well as air discharge is evaluated to determine the position of arc-center. The butted portions of fibers can therefore be repositioned with respect to the arc-center. The method relies on historical data collected in sequences of splices, and thus the accuracy of the method unfortunately decreases with decreasing numbers of splices. Therefore, the method may not be suitable for applications where combinations of fiber types are frequently changed.

A modified method for determining the arc center is disclosed in U.S. patent Publication No. US 2003/0002827. With this method, a preliminary arc-discharge is generated between electrodes without positioning optical fibers at the arc-discharge area. Though the method may be used for estimating the arc position, the error in the estimation of arc position could be quite large, e.g. up to 20 $\mu$m. The error is mainly caused by the preliminary arc-discharge itself, since it works as the process of electric cleaning, which in turn changes the condition of particle deposition on the electrodes and causes an additional arc-walk that affects forthcoming fusion processes. Furthermore, in comparison of heat-distribution with and without fiber insertion in the effective area of arc-discharge, it is found that the confinement of heat-distribution could also be varied by the surface/solid plasma excitation caused by energy deposition onto the fibers. Thus, the accuracy of this method could be further degraded due to changes of heat-distribution.

Therefore, there is a need in the art to develop a method and arrangement that can avoid the drawbacks of the existing techniques so that low splice losses for the HRED fibers can be obtained.

SUMMARY

The present invention provides a method and arrangement for achieving low splice-losses when connecting Highly Rare-Earth-Doped (HRED) optical fibers and dissimilar optical fibers having a large Mode Field Diameter (MFD) mismatch. Warm images are taken during a pre-fusion process. Thermal light emissions from both the air-discharge and the fiber are analyzed, and an arc-center position is determined. By taking into account the light propagation direction and the degree of MFD-mismatch, the end-surfaces of the HRED fiber and the dissimilar fiber are intentionally positioned with a relatively large longitudinal offset with respect to the arc-center. The abutted portions of the two fibers are then asymmetrically heated with different fusion temperatures during the main fusion processes. The MFD-expansion of the HRED fiber due to the fast diffusion of dopants in the core of the HRED fiber can therefore be controlled, and the MFD-match is achieved with well-defined fusion currents and fusion time. In order to maintain the same offset distance in a sequence of splices, the main-fusion arc-center position is accurately determined by a process of direct arc-recentering. Therefore, consistent results of splice losses are obtained for each splice. For stabilization of splicing processes, variations of fusion temperature caused by changes of electrode conditions and the operating environment are monitored in real-time, and an arc-check process is invoked to compensate for the large variations of fusion temperature.

Thus, in one aspect, the present invention is directed to a method of splicing dissimilar optical fibers. The method determines during a pre-fusion process, an arc-center position by analyzing thermal light emissions captured in a warm image of a low-power electrical arc utilized to clean micro-dust particles from an end-surface of a first optical fiber and an end-surface of a second dissimilar optical fiber, longitudinally positioned adjacent to each other. The method also includes the steps of determining a longitudinal offset distance from the arc-center position; abutting the two end-surfaces; longitudinally positioning the two abutted end-surfaces at the offset distance from the arc-center position; and asymmetrically heating the repositioned abutted end-surfaces with a high-power electric arc centered at the arc-center position, thereby fusing the two dissimilar optical fibers. The method may also include the steps of monitoring variations of fusion temperature in real-time; and invoking an arc-check process to adjust the high-power electric arc to compensate for detected variations of fusion temperature.

In another aspect, the present invention is directed to a method of splicing dissimilar optical fibers that includes the steps of longitudinally positioning an end-surface of a first optical fiber adjacent to an end-surface of a second, dissimilar optical fiber so that a gap is formed between the two end-surfaces, wherein the end-surfaces are positioned in a splicer so that a center of the gap is aligned with the splicer electrodes; cleansing micro-dust particles from the two end-surfaces with a low-power electric arc generated by the splicer electrodes; capturing a warm image of the two end-surfaces and the gap during the cleansing step; and determining a pre-fusion arc-center position by analyzing thermal light emissions captured in the warm image. The method also includes the steps of determining an offset distance from the pre-fusion arc-center position based on a direction of light propagation and a degree of Mode Field Diameter (MFD) mismatch between the dissimilar optical fibers; abutting the two end-surfaces; longitudinally repositioning the two abutted end-surfaces by the offset distance with respect to the pre-fusion arc-center position; and asymmetrically heating the repositioned abutted end-surfaces with a high-power electric arc generated by the splicer electrodes, thereby fusing the two dissimilar optical fibers.

In yet another aspect, the present invention is directed to an arrangement for splicing dissimilar optical fibers. The arrangement includes means for longitudinally positioning an end-surface of a first optical fiber and an end-surface of a second dissimilar optical fiber adjacent to each other in a splicer; means for applying a low-power electrical arc to the adjacent end-surfaces to clean micro-dust particles from the two end-surfaces; a camera for capturing a warm image of thermal light emissions emitted from the low-power electrical arc and the optical fibers during the cleaning of the micro-dust particles; and means for determining a pre-fusion arc-center position by analyzing the thermal light emissions captured in the warm image. The arrangement also includes means for determining a longitudinal offset distance from the pre-fusion arc-center position; means for abutting the two end-surfaces and longitudinally positioning the two abutted end-surfaces at the offset distance from the pre-fusion arc-center position; and means for asymmetrically heating the repositioned abutted end-surfaces with a high-power electric arc centered at the arc-center position, thereby fusing the two dissimilar optical fibers.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

Figure 1A:
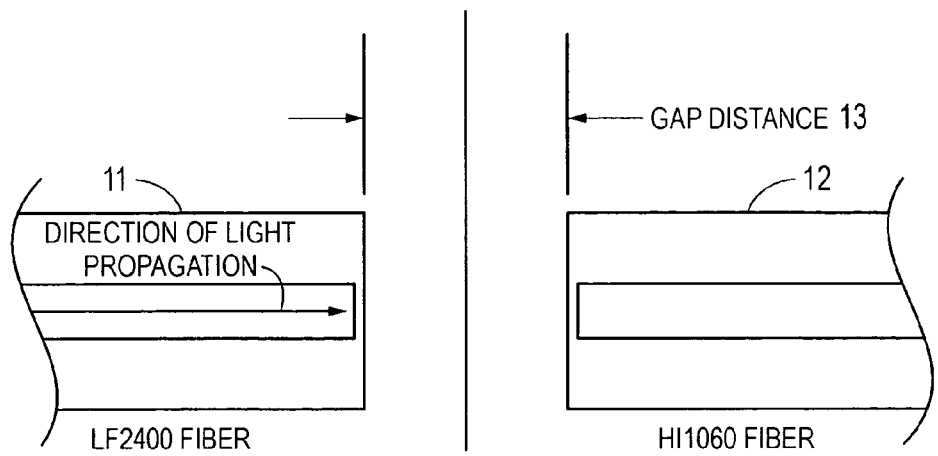
FIGS. 1A–1D illustrate procedures for offset-splicing an HRED fiber and a None-Rare-Earth-Doped (NRED) fiber in accordance with a first embodiment of the present invention.

In accordance with the teachings of the present invention, an improved method is provided for reducing splice-losses when connecting all types of dissimilar optical fibers for various applications. In the exemplary embodiments described herein, the method is used to connect HRED optical fibers and dissimilar optical fibers having a large MFD mismatch.

The first process to be understood for the present invention is the process of offset splicing. When an optical fiber is heated by an electrical arc, the temperature in the center of the fusion area may exceed 2000° C. With such high temperatures, the heating is effectively transferred from the cladding to the core even though the thermal conductivity of silica-based optical fiber is rather poor. When the temperature inside the fiber reaches the melting point of silica (i.e., 1800° C.), the mobility of rare-earth dopants in the core increases rapidly with increasing temperature. The fast diffusion of dopants from the core to the cladding occurs within very short time (e.g., <0.3 sec). As a consequence of the diffusion, an effective MFD with a larger cross-section is formed, and the effective MFD continuously expands with increasing fusion time. The fusion time to reach the MFD-match for different types of HRED fibers may vary significantly, depending mainly on the concentration of dopants in the core of fibers, the initial MFD-mismatch, and fusion parameters such as fusion currents and the like used in the main fusion processes.

In contrast to HRED fibers, the dopant diffusion for None-Rare-Earth-Doped (NRED) fibers (e.g., Corning SMF28™, PureMode™ HI1060, and the like) is rather weak. The time needed for significantly increasing the MFD (for example by 30 percent or so), could be as long as a few minutes. Because of the significant difference in the time scale of diffusion between HRED and NRED fibers, the diffusion process in the core of the HRED fibers determines the fusion time for achieving the final MFD-match in the main fusion processes.

When fusion-splicing dissimilar type of fibers, the splice losses depend strongly on the direction of light propagation. The phenomenon of directional dependence of splice losses may be explained by the transition-loss theory using a propagating-beam method (cf. K. Shiraishi, et al; *J. Lightwave Technol.*, vol.11, p1584, 1993). According to this theory, the directional dependence of splice losses is not negligible if the phase-front of propagating light waves is not completely preserved after the light waves pass the splice point. In Applicant's experiments, it was found that two conditions, the long-range thermal heat (e.g., >5mm) and the large MFD-expansion of two fibers (for example by a factor of approximately 2), provide the basic conditions for preserving the phase-front of waves propagating at the splice point. Unfortunately, commercial splicers available in the market can only perform a short-range thermal heat, 200–300 $\mu$m typically. With the short-range thermal heat, it is difficult to preserve the phase-front of propagating waves, and the cladding modes are usually excited when light passes through the splice point. As a consequence, high splice loss occurs.

Applicant's experiments have also shown that splice losses depend strongly on the degree of MFD-expansion in the core of the HRED fiber, and on the profiles of the MFD at the butted portions of the fibers. The lowest splice losses are usually obtained at a state referred to as "the quasi-match of MFD". The state of "the quasi-match of MFD" refers to: (1) if light is injected from the side of HRED fiber, the lowest splice loss is obtained if the final MFD of the HRED fiber is small relative to the MFD of the NRED fiber; and (2) if light is injected from the NRED fiber, a relatively larger and tapered-shape of MFD profile at the abutted portion of the HRED fiber, compared to the MFD of the NRED fiber, is needed.

In order to achieve the state of "the quasi-match of MFD" when splicing dissimilar types of fibers, a process using longitudinal offset-splicing is proposed. The basic idea of longitudinal offset-splicing is to asymmetrically heat the butted portions of dissimilar fibers with different fusion temperatures during the fusion processes. For covering various applications in optical communication systems, four typical cases with well-defined fiber combinations and directions of light propagation are identified. The four cases are:

Case 1: the light is injected from the HRED fiber, and the initial MFD-mismatch of the two fibers is relatively small. A typical example is the fiber combination between Liekki LF2400™ (an HRED fiber with a peak absorption of approximately 40 dB/m and a corresponding MFD of approximately 6 $\mu$m @1550 nm) and Corning PureMode™ HI1060 (an NRED fiber with an MFD of approximately 8.5 $\mu$m @1550 nm). This combination provides an initial MFD-mismatch of approximately 2.5 $\mu$m.

Case 2: the light is injected from the NRED fiber, and the initial MFD-mismatch of the two fibers is relatively small. A typical example is the same fiber combination described for Case 1.

Case 3: the light is injected from the HRED fiber, and the initial MFD-mismatch of the two fibers is relatively large. A typical example is the fiber combination between Liekki LF2400™ and Corning SMF28™ (an NRED fiber with an MFD of approximately 10.5 $\mu$m @1550nm). This combination provides an initial MFD-mismatch of approximately 4.5 $\mu$m.

Case 4: the light is injected from the NRED fiber, and the initial MFD-mismatch of the two fibers is relatively large. A typical example is the same fiber combination described for Case 3.

For understanding the process of offset splicing, Case 1 can be studied as an example. In Case 1, the light is injected from the HRED LF2400™ fiber. According to the arguments of "the quasi-match of MFD", the final MFD expansion of the LF2400™ fiber should be equal to or smaller than the initial MFD difference between the LF2400™ fiber and the NRED PureMode™ H11060 fiber (i.e., <2.5 $\mu$m). To expand the MFD of the LF2400™ fiber with standard fusion processes to get "the quasi-match of MFD", Applicant has found that a very short fusion time of approximately 0.5 sec must be used. Within such a short time, however, poor quality of splices with low strength often occurs. This occurs because the complete liquidation of the butted portions of the fibers is not achieved during the given fusion time. Thus, in order to obtain good quality of splices, the fusion time must be significantly increased.

When offset splicing, the butted portion of the HRED LF2400™ fiber is positioned with a large offset distance of 40 $\mu$m with respect to the arc-center. Thus, the butted portion of the LF2400™ fiber can be heated with a relatively low fusion temperature. The time needed for accumulating enough energy to excite the solid plasma inside the fiber is therefore significantly increased, which in turn significantly slows down the diffusion process. Applicant has found that a fusion time of approximately 2–3 seconds is appropriate. This significant increase of fusion time makes it possible to optimize fusion parameters such as the offset distance, fusion currents, fusion time, overlap distance, and the like. After optimization, low splice losses are achieved.

FIGS. 1A–1D illustrate procedures for offset-splicing an HRED fiber and an NRED fiber in accordance with a first embodiment of the present invention. In particular, the figures illustrate procedures for offset-splicing the fiber combination of the Liekki LF2400™ fiber 11 and the Corning PureMode™ H11060 fiber 12. After loading the fibers into a splicer, cold-images of the fibers are taken, and the relative positions of their end surfaces are determined. This may be done, for example, utilizing a built-in digital imaging system in the splicer. The end surfaces are moved close to each other with a well-defined gap distance 13 as illustrated in FIG. 1A. The gap distance is set to be equal to the half width of the effective arc-discharge area, typically 100–150 $\mu$m. During movement of the fibers, the center of the gap is transversely aligned to the electrodes (not shown), which are positioned along the vertical black line at the center of the gap.

Figure 1B:
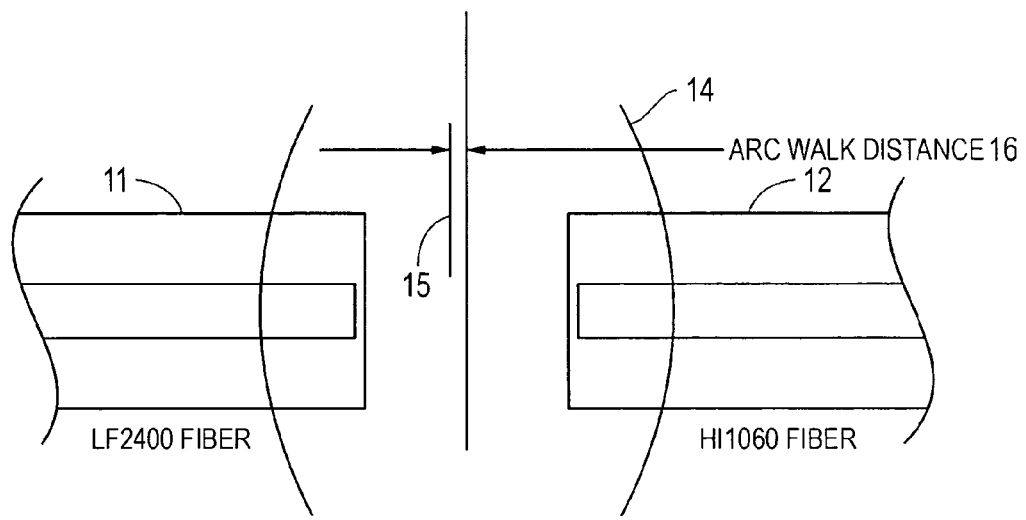

In FIG. 1B, a pre-fusion process is performed by applying a short arc-discharge 14. The purpose of the pre-fusion process is to remove micro-dust particles left on the surfaces of the fibers after fiber preparation. A low fusion current, $I_{pre}$, and a short fusion time, $t_{pre}$, must be used in the pre-fusion process. The $I_{pre}$ and $t_{pre}$ should be set so that the micro-dust particles are effectively removed, but the fast diffusion in the LF2400™ fiber 11 is prevented. Exemplary settings are $I_{pre} \leq 7$ mA and $t_{pre} \leq 0.2$ sec. During the pre-fusion process, warm-images are taken to extract arc-distribution information, particularly the arc-center position 15.

Utilizing digital imaging analysis techniques, the relative position of arc-center is precisely determined, and the "arc-walk" distance 16 is derived.

Figure 1C:
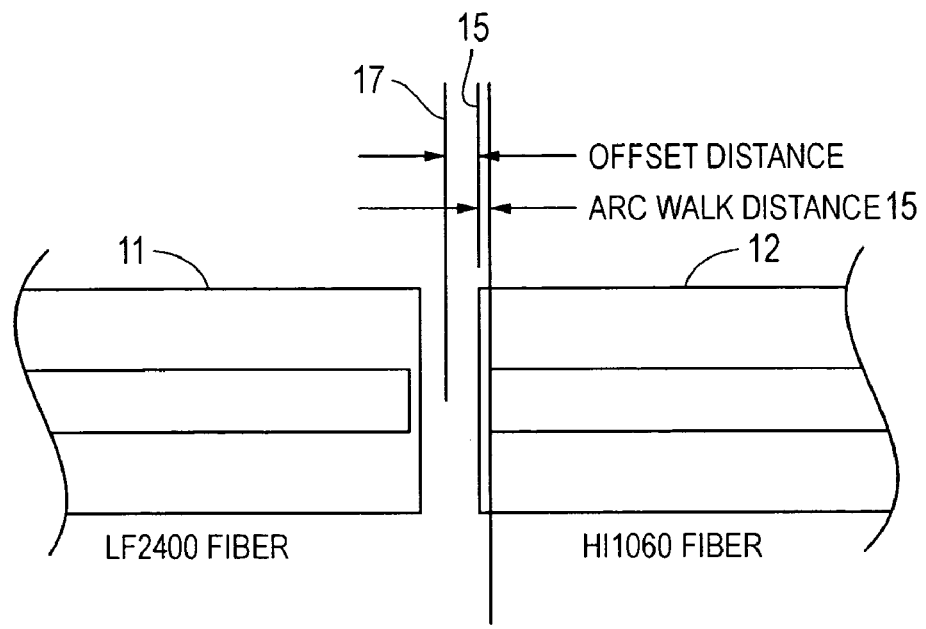
Figure 1D:
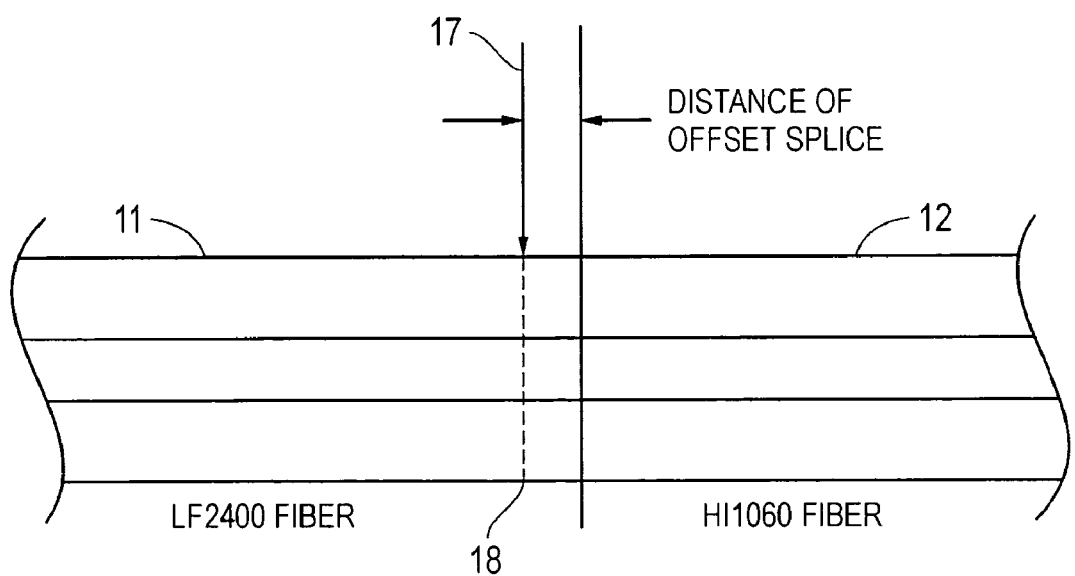

In FIG. 1C, the arc-distribution information is utilized to longitudinally reposition the end-surfaces of the fibers to produce a large offset 17 with respect to the arc-center. The offset distance is set in such way that the HRED LF2400™ fiber 11 is positioned at a relatively low temperature range of the arc-distribution area. Here, the relative distance between the center of the butted portions and the center of arc-distribution defines the offset distance. Standard fusion processes are then applied in FIG. 1D to obtain an offset splice 18.

Figure 2A:
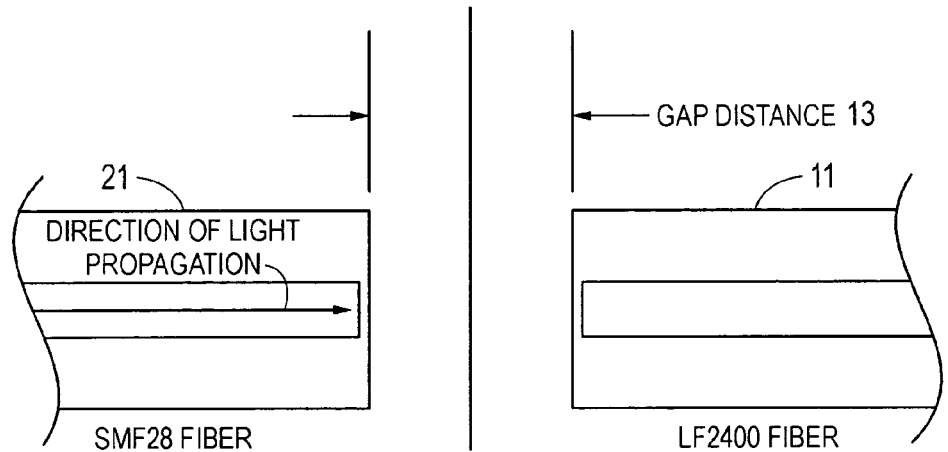
FIGS. 2A–2D illustrate procedures for offset-splicing an HRED fiber and an NRED fiber in accordance with a second embodiment of the present invention.

FIGS. 2A–2D illustrate procedures for offset-splicing an HRED fiber and an NRED fiber in accordance with a second embodiment of the present invention. In particular, the figures illustrate procedures for offset-splicing the fiber combination of Case 4, i.e., the NRED Corning SMF28™ fiber 21 and the HRED Liekki LF2400™ fiber 11. In Case 4, the light is injected from the SMF28™ fiber, as shown in FIG. 2A. After loading the fibers into the splicer, cold-images of the fibers are taken, and the relative positions of their end surfaces are determined. This may be done, for example, utilizing the built-in digital imaging system in the splicer. The end surfaces are moved close to each other with a well-defined gap distance 13 as illustrated in FIG. 2A. The gap distance is set to be equal to the half width of the effective arc-discharge area, typically 100–150 μm. During movement of the fibers, the center of the gap is transversely aligned to the electrodes (not shown), which are positioned along the vertical black-line at the center of the gap.

Figure 2B:
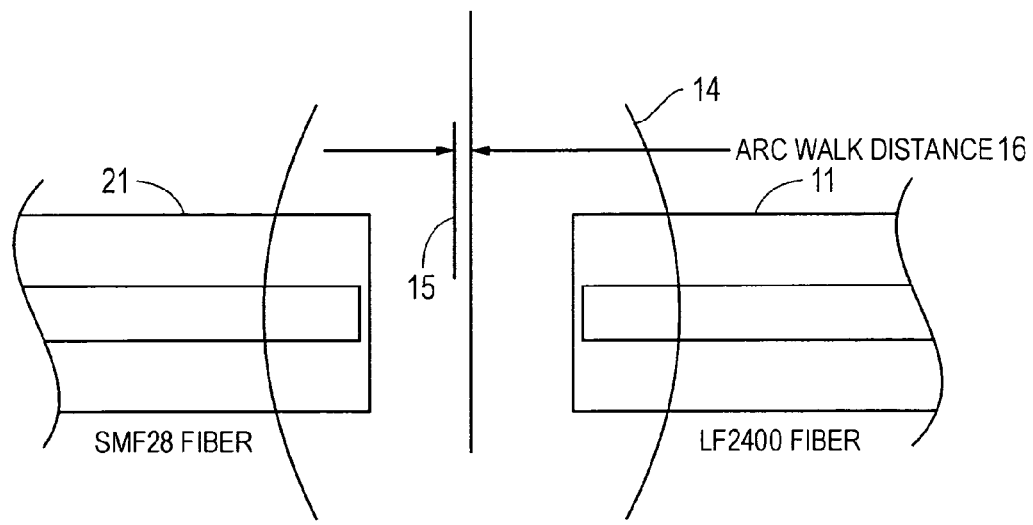

In FIG. 2B, the pre-fusion process is performed by applying a short arc-discharge 14. Like Case 1 above, the purpose of the pre-fusion process is to remove micro-dust particles left on the surfaces of the fibers after fiber preparation.

Figure 2C:
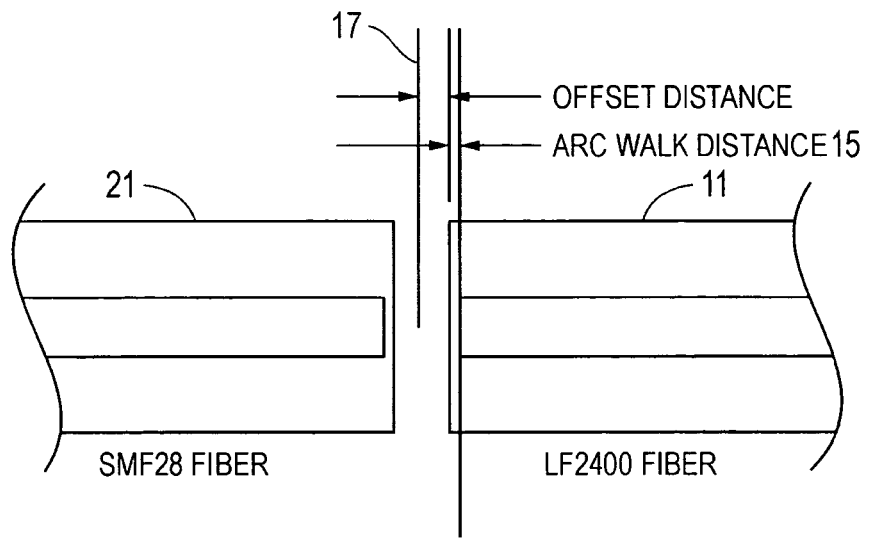
Figure 2D:
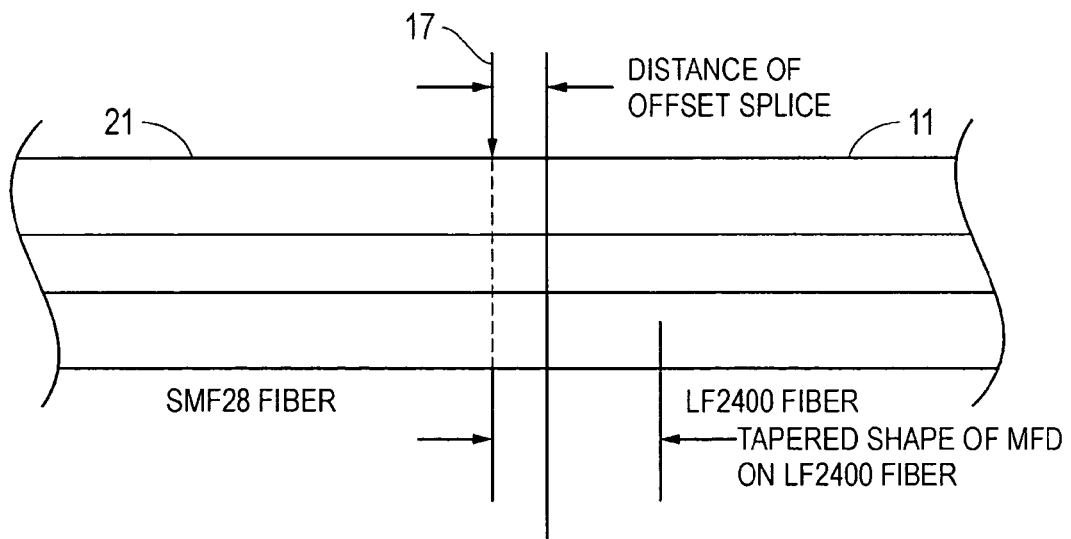

In order to obtain "the quasi-match of MFD", the required MFD-expansion for the HRED Liekki LF2400™ fiber should be equal to or larger than the initial difference of the MFD between the two fibers (i.e., $\geq 4.5$ μm), and the shape of the MFD for the LF2400™ fiber at the abutted portion should be tapered. In FIG. 2C, the longitudinal offset for the butted portion of the LF2400™ fiber is set in the opposite direction of Case 1, which results in the butted portion of the LF2400™ fiber being intentionally heated in a relatively higher temperature range of the arc-distribution area. In fact, the unique phenomenon of fast-diffusion of dopants occurring in the LF2400™ fiber is used to speed up expansion of the MFD so that the state of "the quasi-match of MFD" is achieved within the time window used for standard fusion processes (e.g., 2–3 seconds). Standard fusion processes are then applied to obtain an offset splice 18 in FIG. 2D.

The direction for setting the offset with respect to the arc-center is mainly determined by the direction of light injection. The optimized distance of offset should be experimentally determined by taking into account, the initial MFD-mismatch and the speed of diffusion in the core of the HRED fiber. In Case 1 and Case 2, for example, the offset distance of 40 μm is used to achieve the lowest splice losses for this particular fiber combination. For Case 3, a different offset distance of 20 μm is used to achieve the lowest splice losses, while a 40 μm offset distance is used for Case 4.

Another process to understand for the present invention is the process of direct arc recentering. When the high-voltage is applied to the electrodes, the large difference in potential and kinetic energies between the electrodes causes ejection of loose-banded particles and/or layers deposited on the electrodes. On the other hand, high fusion temperature over 1800° C. in the effective area of arc-discharge evaporates materials, mainly from silica particles of fibers. These materials are condensed and deposited on the electrodes when the arc-discharge is off. The dynamic changes of particle deposition on the electrodes lead to the "arc-walk". The arc-walk varies the arc-center position from one arc-discharge to the next. Arc-walk distances as large as 10–30 μm are often found in various fusion processes.

The longitudinal direction profile of arc-discharge can be expressed by Gaussian-distribution. Since the profile of a Gaussian-distribution is quite flat near its center, the relative small arc-walk (e.g., in the range of +–20 μm with respect to the electrodes), usually results in small changes of fusion temperature, typically <15%. For standard fusion processes, the splice point is positioned at the center of the electrodes. Thus, due to small changes in fusion temperature, splice losses are not strongly affected by the relatively small arc-walk distances. For offset-splicing, however, the process is highly sensitive to the arc-walk, especially when splicing HRED fibers. This is because, in the case of offset-splicing, the splice point is positioned far from the center of the electrodes. In fact, the splice point is located in the range of steep slope on the Gaussian-profile. Thus, the arc-walk distance of 20–30 μm could easily lead to 30–50% variation of fusion temperature, which often results in one order of magnitude change in splice losses. Therefore, in order to maintain the optimized fusion temperature in a sequence of splices, one has to precisely determine the arc-center positions so that the same value of relative distance between the arc-center and the splice point can be set. To achieve this objective, the present invention utilizes the process of "direct arc-recentering".

When the arc is on, the plasma of residual air in the fusion area is excited, which generates high temperature. With the high temperature, the solid plasma inside the fibers is also excited. As a consequence of the plasma excitations, both the residual air and the fibers emit light due to thermal radiation. The light can be observed by the charge-coupled device (CCD)-camera included in the imaging system of the splicer. Since the intensity-distribution of light emission from both the residual air and the fibers is directly correlated to the intensity distribution of the arc-discharge, information on spatial movement of the arc can therefore be derived by carefully analyzing the intensity-distribution of the emitted light.

In Applicant's experiments, it was found that a typical time delay between the plasma excitation of the residual air and the solid plasma excitation in the core of the fiber is around 0.3 sec, while the typical time needed for effective electrical cleaning of the fiber is 0.2 sec. Therefore, the pre-fusion process may be utilized for the detection of arc-distribution without causing the dopant diffusion of the HRED fiber.

Figure 3:
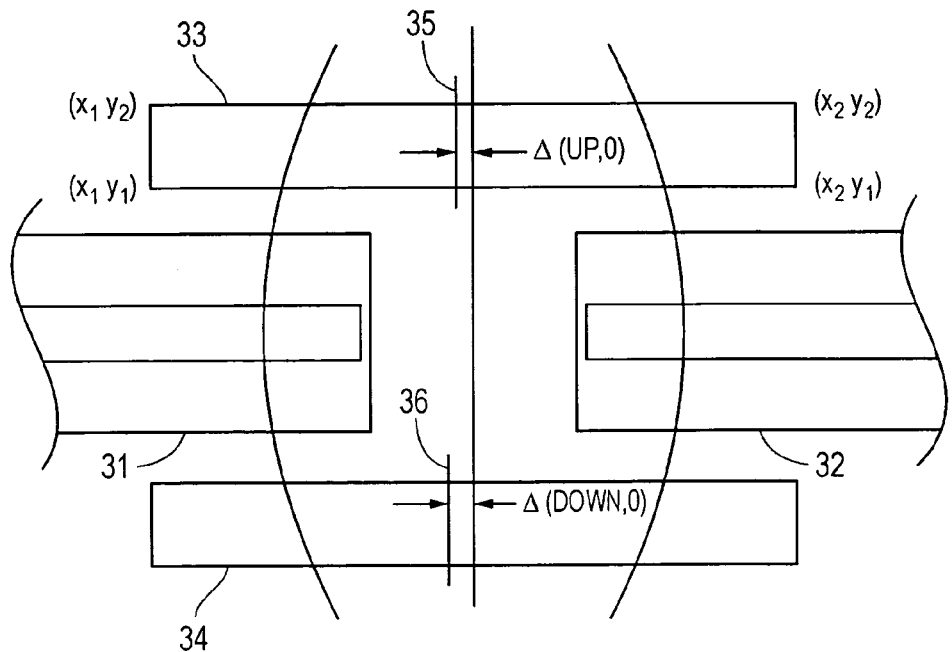
FIG. 3 is a reproduction of a warm image of two fibers taken during the pre-fusion process.

FIG. 3 is a reproduction of a warm image of two fibers 31 and 32 taken during the pre-fusion process. Light intensity-distributions from the residual air are extracted from a rectangular area 33 above the fibers and a rectangular area 34 below the fibers. The intensity-distributions are Gaussian profiles in both longitudinal and transverse directions. In order to precisely determine the position of arc-center, a method referred to as the "center of gravity" of light intensity-distribution may be utilized. If one assumes that the upper rectangular area can be defined by coordinates {(x1, y1), (x2, y1), (x2, y2), (x1, y2)}, the center position of arc-distribution for the upper rectangular area, $X_{arc,up}$, 35 can be calculated by:

$$X_{arc,up} = \frac{\int_{y1}^{y2}\int_{x1}^{x2} xL_{up}(x,y)dxdy}{\int_{y1}^{y2}\int_{x1}^{x2} L_{up}(x,y)dxdy} \qquad (1)$$

$$L_{up}(x,y) = \max[L_{min}, L(x,y) - L_{BG}] \qquad (2)$$

where, $L(x,y)$ is the light intensity at coordinates $(x, y)$; $L_{BG}$ is the average intensity of background light, which depends on the settings of imaging system; and $L_{min}$ is a pre-defined minimum value of light intensity to avoid divergence of integrations defined in equation (1). The value of $L_{min}$ is set to be positive, and may be obtained by experiments or by an educated guess.

Thus, the initial distance of arc-walk $\Delta(up,0)$ for the pre-fusion at the upper-side area can be calculated by:

$$\Delta(up,0) = X_{arc,up} - X_{center} \qquad (3)$$

where, $X_{center}$ is the position of the electrodes, which is defined by the mechanical de-sign of the splicer. If one defines a similar function $L_{down}(x,y) = \max[L_{min}, L(x,y) - L_{BG}]$ for the lower rectangular area, the same procedures described above for the upper rectangular area can be used to calculate the center position of arc-distribution 36 in the lower rectangular area, arc-walk $\Delta(down,0) = X_{arc,down} - X_{center}$. Thus, the initial arc-walk distance $\Delta(arc\text{-}walk,0)$ for the pre-fusion process can be estimated by:

$$\Delta(arc\text{-}walk,0) = \tfrac{1}{2}[\Delta(up,0) + \Delta(down,0)]. \qquad (4)$$

It can be assumed that the offset distance used in the offset-splicing process is defined by $\Delta(offset)$, and the reference zero position is defined by the position of the electrodes (i.e., $X_{center}=0$). Thus, the center position between butted portions of two fibers, $X_{splice}$, for defining the splice point in the main fusion processes can be set to:

$$X_{splice} = \Delta(arc\text{-}walk,0) + \Delta(offset). \qquad (5)$$

For normal splicing processes, the offset distance is usually set to zero (i.e., set $\Delta(offset)=0$). Thus, prior to the main fusion processes, the splice point can be repositioned and aligned to the predicted arc-center derived from the pre-fusion process (i.e., set $X_{splice}=\Delta(arc\text{-}walk,0)$. This is the so-called process of "direct arc-recentering".

While the process of direct arc-recentering has experimentally proved to be very effective for eliminating the impact of arc-walk and for maintaining the optimized fusion temperature at the butted portion of the fibers, direct arc-recentering alone cannot handle the large change of condition of the electrodes. The large and random arc-walk during the main fusion processes indicates that significant wear of the electrodes is occurring. It is therefore necessary not only to detect the arc-walk in the pre-fusion process, but also to monitor the arc-walk during the main fusion processes, preferably in real time.

Figure 4:
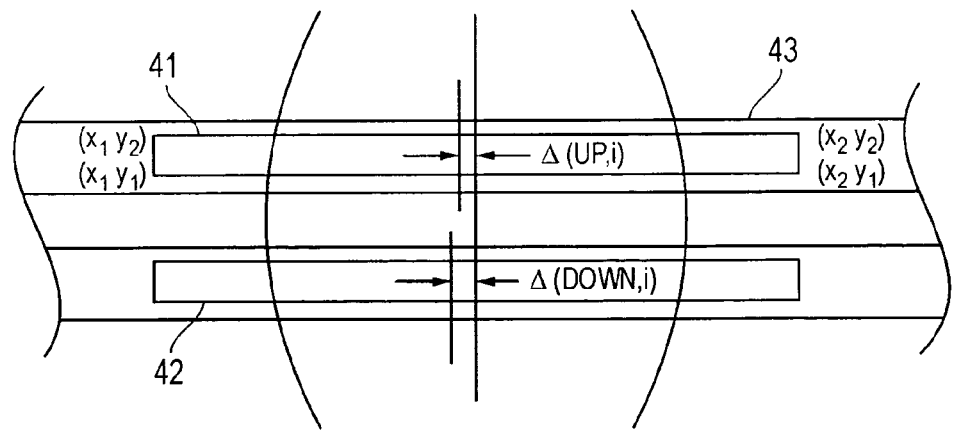
FIG. 4 is a reproduction of a warm image of two fibers taken during the main fusion processes.

FIG. 4 is a reproduction of a warm image of two fibers taken during the main fusion processes. Compared to the pre-fusion process of FIG. 3, the light intensity of the air-discharge in FIG. 4 is significantly suppressed. This change is intentionally made by adjusting the CCD-camera settings for special applications such as extraction of information on the core for loss estimation. In this case, an upper rectangular area 41 and a lower rectangular area 42 for extracting arc-walk information are defined inside the fiber 43 rather than outside the fiber as in FIG. 3.

In order to monitor the arc-walk in real-time during the main fusion processes, warm images are periodically taken with a cycle time of, for example, 100 ms. The images are analyzed using the same method discussed in reference to FIG. 3. Assuming the variation of arc-walk as a function of time can be expressed by $\Delta(arc\text{-}walk, i)$; $i=1, 2, \ldots, n$; the large change of electrode condition can be defined by introducing the pre-defined threshold of arc-walk, $\delta_{th}$ (e.g. $\delta_{th}=30\,\mu m$), with reference to the initial measured arc-walk. That is:

$$\delta_i = |\Delta(arc\text{-}walk, i) - \Delta(arc\text{-}walk, 0)| \geq \delta_{th} \qquad (6)$$

Where, $\delta_i$ is the relative changes of arc-walk distances. In the control process, if the condition expressed by equation (6) is fulfilled, a warning sign is given, and the main fusion processes are terminated. Additionally, a process known as the "arc-check process" is invoked to compensate for the changes and to recover the optimized fusion temperature.

It is well known that fusion temperature in the splicer varies due to significant changes in the operating environment (for example, changes of altitude (A), external temperature (T), humidity (H), and the like). Even in a well-defined operating environment, the fusion temperature may still vary because of changes in electrode conditions (for example, wear of the electrodes and/or dynamic changes of silica layers deposited on the electrodes). Additionally, even for the same settings of fusion parameters such as fusion currents and fusion time, finite tolerances in the manufacturing processes of splicers may also result in different fusion temperatures among the same type of splicers. As a consequence of fusion temperature variation in a particular splicer and/or among several splicers of the same type, inconsistent splicing results are obtained, as determined for example, by splice losses, splice strength, and loss estimation.

The present invention uses the arc-check process together with the offset-splicing process to overcome the problems of fusion temperature variation and to recover the optimal fusion temperature in various fusion processes. This enables the invention to consistently achieve low splice losses. The arc-check process is a method for calibrating fusion temperature in an optical fiber splicing device in which fusion currents are supplied to electrodes to produce an electrical arc for heating the fiber splicing. The fusion currents are compensated in terms of external temperature, humidity, and altitude where the calibration is performed. When an optical fiber is heated by electrical arc, temperature in the center of fusion area is over 2000° C. In such a high temperature, the fiber in the fusion area is liquidized. Since the viscosity of a liquid decreases with increasing temperature, a temperature dependence of viscosity distribution will be created in the fusion area, which results in tangential forces at the vicinity of the cladding and/or inside of the fiber. As a consequence, the cladding diameter is reduced at the center of the electrical arc during an extended fusion time. The fusion temperature is determined based on real-time detecting of the reduction of cladding diameter of the warm-fiber positioned at the center of the electrical arc. The fusion temperature determination is used to calculate new currents needed for replacing values of expected fusion currents in various splicing processes.

To maintain the optimal fusion temperature, besides the criterion given in equation (6), i.e., $\delta_i \geq \delta_{th}$, additional criteria are used in the offset-splicing process to invoke the process of arc-check. They are:

$$\Delta T=|T_{j+1}-T_j|\geq T_{th};\ T_{j+1}\ \text{and}\ T_j\epsilon\{T_{min},\ T_{max}\} \quad (7)$$

$$\Delta H=|H_{j+1}-H_j|\geq H_{th};\ H_{j+1}\ \text{and}\ H_j\epsilon\{H_{min},\ H_{max}\} \quad (8)$$

$$\Delta A=|A_{j+1}-A_j|\geq A_{th};\ A_{j+1}\ \text{and}\ A_j\epsilon\{A_{min},\ A_{max}\} \quad (9)$$

j=0,1,2, ... m

Where, $\Delta T$, $\Delta H$, and $\Delta A$ are the significant changes of external temperature, humidity, and altitude, respectively. The changes are derived by comparing the measured values of the current splice and that of a former splice. The measurements may be taken using the built-in sensors in the splicer. $T_{th}$, $H_{th}$, and $A_{th}$ are the threshold values for temperature, humidity and altitude, and typical values are 10° C., 20% RH, and 200 meters, respectively. $T_{min}$, $T_{max}$, $H_{min}$, $H_{max}$, $A_{min}$, and $A_{max}$ define the working range of splicers. The serial number of splices is represented by j.

Considering compensations due to altitude, for example, the fusion currents are adjusted based on measuring the altitude with the help of a built-in altimeter in the splicer, by using the equation:

$$I_i^* = h_1 I_i + (h_2 H + h_3 I_i + h_4)^2 + h_5 \quad (10)$$

where H is the altitude, $I_j$ (j=1, 2, ...) are the fusion currents before compensation, $I_j^*$ (j=1, 2, ...) are the compensating currents used in the calibrating process, and $h_k$ (k=1, 2, ... 5) are fitting parameters. After the initial position of the arc-center is located, the fiber ends are repositioned with respect to the arc-center. The electric arc is then started with a main fusion current, heating the abutted point of the two optical fibers and connecting them together to give a splice. The initial cladding diameter of the warm-fiber is measured, and the main fusion current is replaced with a target current ($I_{c,1}$).

A total heating time ($t_{c,1}$) is then estimated and the calibration process is started. The heating time is estimated using the exponential decay function:

$$t = c_1 e^{-c_2 I} \quad (11)$$

where $c_1$ and $c_2$ are fitting constants. With the help of equation (11), the variations of fusion temperature due to the changes of operating environment, the changes of electrodes conditions, and the machinery tolerances can be calibrated. The abutted point is continually heated with the target current ($I_{c,1}$) and the reduction of cladding diameter of warm-fiber is measured until the diameter reaches a predetermined threshold value. The electrical arc is then stopped, and a total fusion time ($t_2$) spent on the calibrating process is calculated. A corresponding current ($I_{c,2}$) is then derived using equation 11.

An amount of fusion current needed for compensation ($\Delta I_c = I_{c,1} - I_{c,2}$) is then calculated, together with correction factors $\delta_i$ for compensating the difference in current between the target current used in the calibrating process and currents used in various splicing processes. The correction factors may be calculated using the equation:

$$\delta_i = 1 - 0.5(I_{c,1} - I_i)/I_{c,1} \quad (12)$$

New currents needed for replacing values of expected fusion currents in various splicing processes are then calculated using the equation:

$$I_{NEW,j} = I_i^* + \delta_i \Delta I_c \quad (13)$$

Additional description of the arc-check process of calibrating fusion temperature can be found in the co-owned published International PCT Application No. WO 03/096088.

Figure 5:
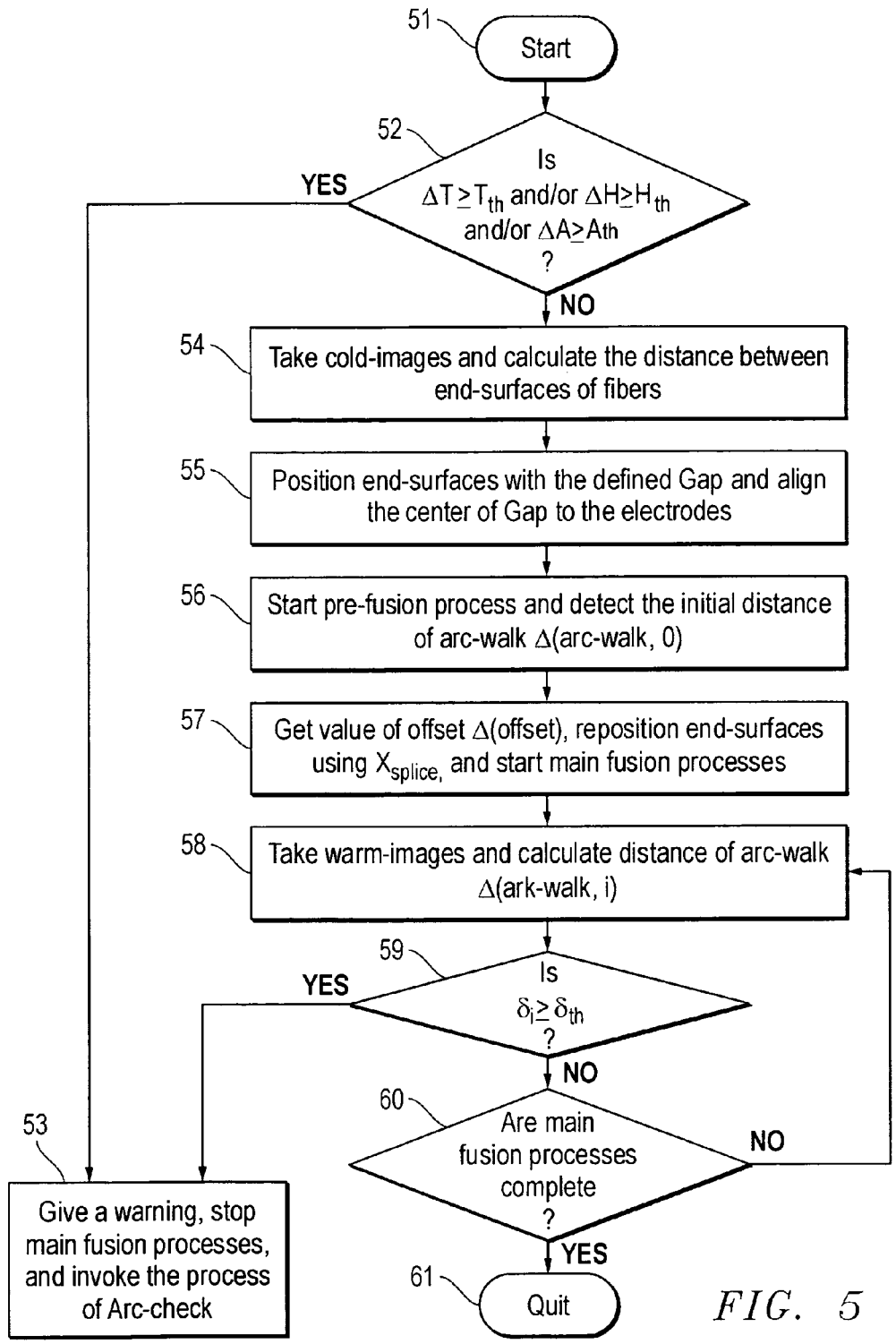
FIG. 5 is a flow chart illustrating the steps of an offset-splicing process in accordance with the teachings of the present invention.

FIG. 5 is a flow chart illustrating the steps of an offset-splicing process in accordance with the teachings of the present invention. The process starts at step 51 and at step 52, it is determined (1) whether the change in external temperature ($\Delta T$) is greater than or equal to the threshold value for temperature ($T_{th}$), and/or (2) whether the change in external humidity ($\Delta H$) is greater than or equal to the threshold value for humidity ($H_{th}$), and/or (3) whether the change in external altitude ($\Delta A$) is greater than or equal to the threshold value for altitude ($A_{th}$). If any of these conditions are met, the process moves to step 53 where a warning is given, the main fusion processes are stopped, and the arc-check process is invoked. However, if none of the conditions are met at step 52, the process moves to step 54 where cold images are taken of the end-surfaces of the fibers, and the distance between the end-surfaces is calculated.

At step 55, the end-surfaces of the fibers are positioned with a defined gap, and the center of the gap is aligned with the electrodes. At step 56, the pre-fusion process is started, and the initial arc-walk distance, $\Delta(\text{arc-walk},0)$, is detected. At step 57, the value of the offset distance, $\Delta(\text{offset})$, is obtained, the end-surfaces of the fibers are repositioned using $X_{splice}$, and the main fusion processes are started. At step 58, warm images are taken of the end-surfaces of the fibers, and the arc-walk distance, $\Delta(\text{arc-walk, i})$, is calculated.

At step 59, it is determined whether the relative change of arc-walk distance ($\delta_1$) is greater than or equal to the pre-defined threshold of arc-walk ($\delta_{th}$). If so, the process moves to step 53 where a warning is given, the main fusion processes are stopped, and the arc-check process is invoked. However, if the relative change of arc-walk distance ($\delta_i$) is less than the pre-defined threshold of arc-walk ($\delta_{th}$), the process moves to step 60 where it is determined whether the main fusion processes are complete. If not, the process returns to step 58 and repeats steps 58–60 until the main fusion processes are complete. At that point, the process ends at step 61.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of splicing dissimilar optical fibers, comprising:
    longitudinally positioning an end-surface of a first optical fiber adjacent to an end-surface of a second, dissimilar optical fiber so that a gap is formed between the two end-surfaces, wherein the end-surfaces are positioned in a splicer so that a center of the gap is aligned with the splicer electrodes;
    cleansing micro-dust particles from the two end-surfaces with a low-power electric arc generated by the splicer electrodes;
    capturing a warm image of the two end-surfaces and the gap during the cleansing step;
    determining a pre-fusion arc-center position by analyzing thermal light emissions captured in the warm image;
    determining an offset distance from the pre-fusion arc-center position based on a direction of light propagation and a degree of Mode Field Diameter (MFD) mismatch between the dissimilar optical fibers;
    abutting the two end-surfaces;

longitudinally repositioning the two abutted end-surfaces by the offset distance with respect to the pre-fusion arc-center position; and asymmetrically heating the repositioned abutted end-surfaces with a high-power electric arc generated by the splicer electrodes, thereby fusing the two dissimilar optical fibers.

2. The method of claim 1, wherein the first optical fiber is a Highly Rare-Earth-Doped (HRED) optical fiber, and the second optical fiber is a None-Rare-Earth-Doped (NRED) fiber having a large Mode Field Diameter (MFD) mismatch with the HRED optical fiber.

3. The method of claim 2, wherein the direction of light propagation is from the HRED fiber to the NRED fiber, and the step of longitudinally repositioning the two abutted end-surfaces by the offset distance includes longitudinally repositioning the two abutted end-surfaces in the direction of the HRED fiber so that a lower fusion temperature is generated in the HRED fiber when the asymmetrical heating step is performed.

4. The method of claim 2, wherein the direction of light propagation is from the NRED fiber to the HRED fiber, and the step of longitudinally repositioning the two abutted end-surfaces by the offset distance includes longitudinally repositioning the two abutted end-surfaces in the direction of the NRED fiber so that a lower fusion temperature is generated in the NRED fiber when the asymmetrical heating step is performed.

5. The method of claim 1, wherein a plurality of splices are performed, and the method is repeated for each splice in the plurality of splices so that a new offset distance is calculated for each splice.

6. The method of claim 5, further comprising:
capturing a warm image of the two abutted end-surfaces during the asymmetrical heating step; and
determining a main-fusion arc-center position by analyzing thermal light emissions captured in the warm image.

7. The method of claim 6, wherein the step of capturing a warm image of the two abutted end-surfaces during the asymmetrical heating step includes capturing a plurality of warm images by periodically capturing a warm image during the asymmetrical heating step.

8. The method of claim 7, wherein the step of periodically capturing a warm image includes capturing a warm image approximately every 100 ms during the asymmetrical heating step.

9. The method of claim 8, further comprising:
determining a main-fusion arc-center position for each of the plurality of warm images captured during the asymmetrical heating step;
for each of the determined main-fusion arc-center positions, determining a difference between the main-fusion arc-center position and the pre-fusion arc-center position;
comparing each of the determined arc-center differences with a difference threshold; and
if a determined arc-center difference exceeds the difference threshold, stopping the asymmetrical heating step.

10. The method of claim 9, further comprising invoking an arc-check process to compensate for large variations of fusion temperature.

11. The method of claim 6, wherein the step of determining a main-fusion arc-center position by analyzing thermal light emissions captured in the warm image includes:
defining an upper rectangular area within an upper portion of the fibers, said upper rectangular area extending longitudinally across the splice and over a portion of each of the fibers, said upper rectangular area being defined by coordinates $\{(x1, y1), (x2, y1), (x2, y2), (x1, y2)\}$;
analyzing light intensity-distributions in the upper rectangular area utilizing the warm image, said analyzing step including:
calculating an upper arc center position, $X_{arc,up}$, utilizing the equations:

$$X_{arc,up} = \frac{\int_{y1}^{y2}\int_{x1}^{x2} xL_{up}(x,y)\,dx\,dy}{\int_{y1}^{y2}\int_{x1}^{x2} L_{up}(x,y)\,dx\,dy} \quad (1)$$

and $$L_{up}(x,y) = \max[L_{min}, L(x,y) - L_{BG}] \quad (2)$$

where, $L(x,y)$ is the light intensity at coordinates $(x, y)$; $L_{BG}$ is the average intensity of background light, which depends on settings of the imaging system; and $L_{min}$ is a pre-defined minimum value of light intensity to avoid divergence of the integrations defined in equation (1); and repeating the defining and analyzing steps for a lower rectangular area within a lower portion of the fibers, said lower rectangular area extending longitudinally across the splice and over a portion of each of the fibers, thereby calculating a lower arc center position, $X_{arc,down}$.

12. The method of claim 11, further comprising:
determining an arc-walk distance in the upper rectangular area, $\Delta(up,0)$, utilizing the equation:

$$\Delta(up,0) = X_{arc,up} - X_{center}$$

where, $X_{center}$ is a position aligned with the electrodes;
determining an arc-walk distance in the lower rectangular area, $\Delta(down,0)$, utilizing the equation:

$$\Delta(down,0) = X_{arc,down} - X_{center};$$

and calculating an initial average arc-walk distance, $\Delta(arc\text{-walk},0)$, utilizing the equation:

$$\Delta(arc\text{-walk},0) = \tfrac{1}{2}[\Delta(up,0) + \Delta(down,0)].$$

13. The method of claim 1, wherein the step of determining a pre-fusion arc-center position by analyzing thermal light emissions captured in the warm image includes:
defining an upper rectangular area above the fibers and the gap, said upper rectangular area extending longitudinally across the gap and over a portion of each of the fibers, said upper rectangular area being defined by coordinates $\{(x1, y1), (x2, y1), (x2, y2), (x1, y2)\}$;
analyzing light intensity-distributions in the upper rectangular area utilizing the warm image, said analyzing step including:
calculating an upper arc center position, $X_{arc,up}$, utilizing the equations:

$$X_{arc,up} = \frac{\int_{y1}^{y2}\int_{x1}^{x2} xL_{up}(x,y)\,dx\,dy}{\int_{y1}^{y2}\int_{x1}^{x2} L_{up}(x,y)\,dx\,dy} \quad (1)$$

and $$L_{up}(x,y) = \max[L_{min}, L(x,y) - L_{BG}] \quad (2)$$

where, L(x,y) is the light intensity at coordinates (x, y); $L_{BG}$ is the average intensity of background light, which depends on settings of the imaging system; and $L_{min}$ is a pre-defined minimum value of light intensity to avoid divergence of the integrations defined in equation (1); and repeating the defining and analyzing steps for a lower rectangular area below the fibers and the gap, said lower rectangular area extending longitudinally across the gap and under the portion of each of the fibers, thereby calculating a lower arc center position, $X_{arc,down}$.

14. The method of claim 13, further comprising:
determining an arc-walk distance in the upper rectangular area, $\Delta(up,0)$, utilizing the equation:

$$\Delta(up,0)=X_{arc,up}-X_{center}$$

where, $X_{center}$ is a position aligned with the electrodes;
determining an arc-walk distance in the lower rectangular area, $\Delta(down,0)$, utilizing the equation:

$$\Delta(down,0)=X_{arc,down}-X_{center};$$

and
calculating an initial average arc-walk distance, $\Delta(arc\text{-}walk,0)$, utilizing the equation:

$$\Delta(arc\text{-}walk,0)=\tfrac{1}{2}[\Delta(up,0)+\Delta(down,0)].$$

15. A method of splicing dissimilar optical fibers, comprising:
determining during a pre-fusion process, an arc-center position by analyzing thermal light emissions captured in a warm image of a low-power electrical arc utilized to clean micro-dust particles from an end-surface of a first optical fiber and an end-surface of a second dissimilar optical fiber, wherein the two end-surfaces are longitudinally positioned adjacent to each other;
determining a longitudinal offset distance from the arc-center position;
abutting the two end-surfaces;
longitudinally positioning the two abutted end-surfaces at the offset distance from the arc-center position; and
asymmetrically heating the repositioned abutted end-surfaces with a high-power electric arc centered at the arc-center position, thereby fusing the two dissimilar optical fibers.

16. The method of claim 15, wherein the step of determining a longitudinal offset distance from the arc-center position includes determining a longitudinal offset distance based on a direction of light propagation and a degree of Mode Field Diameter (MFD) mismatch between the dissimilar optical fibers.

17. The method of claim 16, wherein the wherein the first optical fiber is a Highly Rare-Earth-Doped (HRED) optical fiber, and the second optical fiber is a None-Rare-Earth-Doped (NRED) fiber having a large Mode Field Diameter (MFD) mismatch with the HRED optical fiber.

18. The method of claim 17, wherein the direction of light propagation is from the HRED fiber to the NRED fiber, and the step of longitudinally positioning the two abutted end-surfaces at the offset distance includes longitudinally repositioning the two abutted end-surfaces in the direction of the HRED fiber so that a lower fusion temperature is generated in the HRED fiber when the asymmetrical heating step is performed.

19. The method of claim 15, further comprising
monitoring variations of fusion temperature in real-time; and
invoking an arc-check process to adjust the high-power electric arc to compensate for detected variations of fusion temperature.

20. An arrangement for splicing dissimilar optical fibers, comprising:
means for longitudinally positioning an end-surface of a first optical fiber and an end-surface of a second dissimilar optical fiber adjacent to each other in a splicer;
means for applying a low-power electrical arc to the adjacent end-surfaces to clean micro-dust particles from the two end-surfaces;
a camera for capturing a warm image of thermal light emissions emitted from the low-power electrical arc and the optical fibers during the cleaning of the micro-dust particles;
means for determining a pre-fusion arc-center position by analyzing the thermal light emissions captured in the warm image;
means for determining a longitudinal offset distance from the pre-fusion arc-center position;
means for abutting the two end-surfaces and longitudinally positioning the two abutted end-surfaces at the offset distance from the pre-fusion arc-center position; and
means for asymmetrically heating the repositioned abutted end-surfaces with a high-power electric arc centered at the arc-center position, thereby fusing the two dissimilar optical fibers.

21. The arrangement of claim 20, wherein the camera is also adapted to capture a warm image of the two abutted end-surfaces during the asymmetrical heating step, and the means for determining a pre-fusion arc-center position is also adapted to determine a main-fusion arc-center position by analyzing thermal light emissions captured during the asymmetrical heating step.

22. The arrangement of claim 21, wherein the camera is adapted to capture a plurality of warm images by periodically capturing a warm image during the asymmetrical heating step.

23. The arrangement of claim 22, wherein the camera is adapted to capture a warm image approximately every 100 ms during the asymmetrical heating step.

24. The arrangement of claim 23, further comprising:
means for determining a main-fusion arc-center position for each of the plurality of warm images captured during the asymmetrical heating step;
means for determining a difference between the main-fusion arc-center position and the pre-fusion arc-center position for each of the determined main-fusion arc-center positions;
means for comparing each of the determined arc-center differences with a difference threshold;
means for stopping the asymmetrical heating step if a determined arc-center difference exceeds the difference threshold; and
means for invoking an arc-check process to compensate for large variations of fusion temperature.

25. The arrangement of claim 20, further comprising:
means for monitoring variations of main-fusion temperature in real-time; and
means for adjusting the high-power electric arc to compensate for detected variations of main-fusion temperature.

26. A method of determining an arc-center position of an electrical arc formed between an upper electrode and a lower electrode of a splicer utilized to splice optical fibers, said method comprising:

longitudinally positioning an end-surface of a first optical fiber adjacent to an end-surface of a second optical fiber so that a gap is formed between the two end-surfaces, wherein the end-surfaces are positioned in the splicer so that a center of the gap is aligned with the splicer electrodes;

cleansing micro-dust particles from the two end-surfaces with a low-power electric arc generated by the splicer electrodes;

capturing a warm image of the gap, end-portions of the two fibers, and areas above and below the gap and the end-portions during the cleansing step utilizing an imaging system;

defining an upper rectangular area above the fibers and the gap, said upper rectangular area extending longitudinally across the gap and over a portion of each of the fibers, said upper rectangular area being defined by coordinates {(x1, y1), (x2, y1), (x2, y2), (x1, y2)};

analyzing light intensity-distributions in the upper rectangular area utilizing the warm image, said analyzing step including:

calculating an upper arc center position, $X_{arc,up}$, utilizing the equations:

$$X_{arc,up} = \frac{\int_{y1}^{y2}\int_{x1}^{x2} x L_{up}(x,y)\,dx\,dy}{\int_{y1}^{y2}\int_{x1}^{x2} L_{up}(x,y)\,dx\,dy} \quad (1)$$

and $$L_{up}(x,y) = \max[L_{min}, L(x,y) - L_{BG}] \quad (2)$$

where, $L(x,y)$ is the light intensity at coordinates $(x, y)$; $L_{BG}$ is the average intensity of background light, which depends on settings of the imaging system; and $L_{min}$ is a pre-defined minimum value of light intensity to avoid divergence of the integrations defined in equation (1); and repeating the defining and analyzing steps for a lower rectangular area below the fibers and the gap, said lower rectangular area extending longitudinally across the gap and under the portion of each of the fibers, thereby calculating a lower arc center position, $X_{arc,down}$.

27. The method of claim 26, further comprising:

determining an arc-walk distance in the upper rectangular area, $\Delta(up,0)$, utilizing the equation:

$$\Delta(up,0) = X_{arc,up} - X_{center}$$

where, $X_{center}$ is a position aligned with the electrodes;

determining an arc-walk distance in the lower rectangular area, $\Delta(down,0)$, utilizing the equation:

$$\Delta(down,0) = X_{arc,down} - X_{center};$$

and calculating an initial average arc-walk distance, $\Delta(arc\text{-}walk,0)$, utilizing the equation:

$$\Delta(arc\text{-}walk,0) = \tfrac{1}{2}[\Delta(up,0) + \Delta(down,0)].$$

* * * * *